US007188059B2

(12) United States Patent
White et al.

(10) Patent No.: US 7,188,059 B2
(45) Date of Patent: Mar. 6, 2007

(54) SYSTEM AND METHOD FOR OPERATING SOFTWARE IN A FLIGHT SIMULATOR ENVIRONMENT

(75) Inventors: Daryl A. White, Peoria, AZ (US); John Oss, deceased, late of Peoria, AZ (US); by Shannon Olsen, legal representative, Peoria, AZ (US); Steve J. Schense, Phoenix, AZ (US); Earl Swart, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 863 days.

(21) Appl. No.: 10/080,196

(22) Filed: Feb. 19, 2002

(65) Prior Publication Data

US 2003/0023740 A1    Jan. 30, 2003

Related U.S. Application Data

(60) Provisional application No. 60/269,690, filed on Feb. 17, 2001.

(51) Int. Cl.
*G06F 17/50* (2006.01)
*G06F 3/00* (2006.01)
*G05B 17/02* (2006.01)

(52) U.S. Cl. ............... 703/13; 703/25; 701/202; 702/121; 702/122; 709/224; 709/232

(58) Field of Classification Search .......... 703/13, 703/25; 701/202; 709/224, 232; 702/121–122
See application file for complete search history.

(56) References Cited

U.S. PATENT DOCUMENTS

| 5,017,141 | A | * | 5/1991 | Relf et al. ............... 434/29 |
| 5,184,312 | A | * | 2/1993 | Ellis ....................... 702/121 |
| 5,541,863 | A | * | 7/1996 | Magor et al. ........... 702/122 |
| 5,761,625 | A | * | 6/1998 | Honcik et al. ........... 701/14 |
| 5,862,319 | A | * | 1/1999 | Galetti .................... 714/33 |
| 5,958,012 | A | * | 9/1999 | Battat et al. ............ 709/224 |
| 6,106,298 | A | * | 8/2000 | Pollak ..................... 434/29 |
| 6,134,500 | A | * | 10/2000 | Tang et al. ............. 701/202 |
| 6,314,362 | B1 | * | 11/2001 | Erzberger et al. ....... 701/120 |
| 6,813,777 | B1 | * | 11/2004 | Weinberger et al. ..... 725/76 |

(Continued)

FOREIGN PATENT DOCUMENTS

EP    0 652 526 A1    10/1995

OTHER PUBLICATIONS

"Using FTP for file transfers under Windows: FAQs," http://www.protonique.com/plweb/files/ftp-faq.htm.

(Continued)

*Primary Examiner*—Thai Phan
(74) *Attorney, Agent, or Firm*—Ingrassia Fisher & Lorenz (57) ABSTRACT

The present invention is directed to a system and method for establishing communication between a flight simulator and a secondary control system, such as a Flight Management System ("FMS"). Information can be transmitted between the flight simulator and the secondary control system via a socket in a TCP/IP connection between the two systems. In the event that the secondary control system does not natively communicate in TCP/IP format, the information must be translated to and from the TCP/IP format. In this manner, an actual deliverable version of the secondary control system, possibly operating on can be used.

17 Claims, 6 Drawing Sheets

U.S. PATENT DOCUMENTS

| | | | |
|---|---|---|---|
| 6,839,767 B1* | 1/2005 | Davies et al. | 709/232 |
| 2001/0051971 A1* | 12/2001 | Kato | 709/102 |
| 2001/0052008 A1* | 12/2001 | Jacobus | 709/223 |
| 2004/0153499 A1* | 8/2004 | Heddaya et al. | 709/202 |

OTHER PUBLICATIONS

"ADS-2 Product Overview—Application Areas," http://www.techsat.com/ads/overview/ov1.html.

* cited by examiner

| 31 | | |28|27| | | | | | | | | | |16|15| | | | | | | |8|7|6|5| | | | |0|
|---|---|---|---|---|---|---|---|---|---|---|---|---|---|---|---|---|---|---|---|---|---|---|---|---|---|---|---|---|---|---|---|---|
| R | | | | NUM_WORDS | | | | | | | | | | | | R | | | | | | | | | CAB | | MSG_TYPE | | | | | |

FIG.9

| 31 | |28|27| | | | | | | | | |16|15| | | | | | | |8|7|6|5| | | | |0|
|---|---|---|---|---|---|---|---|---|---|---|---|---|---|---|---|---|---|---|---|---|---|---|---|---|---|---|---|---|---|---|
| R | | | NUM_WORDS=3 | | | | | | | | | | | R | | | | | | | | | R | | P_VERSION | | | | |
| SAFE BUS® VERSION |||||||||||||||||||||||||||||||
| IMM VERSION |||||||||||||||||| P_FLAGS ||||||||||||

FIG.10

| 31 | |28|27| | | | | | | | | |16|15| | | | | | | |8|7|6|5| | | | |0|
|---|---|---|---|---|---|---|---|---|---|---|---|---|---|---|---|---|---|---|---|---|---|---|---|---|---|---|---|---|---|---|
| R | | | NUM_WORDS=2 | | | | | | | | | | | R | | | | | | | | | R | | P_SIM_CLOCK | | | | |
| SIM_CLOCK |||||||||||||||||||||||||||||||

FIG.11

| 31 | |28|27| | | | | | | | | |16|15| | | | | | | |8|7|6|5| | | | |0|
|---|---|---|---|---|---|---|---|---|---|---|---|---|---|---|---|---|---|---|---|---|---|---|---|---|---|---|---|---|---|---|
| R | | | NUM_WORDS=1 | | | | | | | | | | | R | | | | | | | | | R | | P_XEND_FRAME | | | | |

FIG.12

| 31 | | 28 | 27 | | | | | | | | | 16 | 15 | | | | | | | 8 | 7 | 6 | 5 | | | | | 0 |
|---|---|---|---|---|---|---|---|---|---|---|---|---|---|---|---|---|---|---|---|---|---|---|---|---|---|---|---|---|
| R | | | | | NUM_WORDS (2+128) | | | | | | | | | | R | | | | | | R | | P_TEXT | | | | |
| ASCII STRING CONTAINING MESSAGE TEXT | | | | | | | | | | | | | | | | | | | | | | | | | | | |

FIG.13

| 31 | | 28 | 27 | | | | | | | | | 16 | 15 | | | | | | | 8 | 7 | 6 | 5 | | | | | 0 |
|---|---|---|---|---|---|---|---|---|---|---|---|---|---|---|---|---|---|---|---|---|---|---|---|---|---|---|---|---|
| BUS_NUM (MSB) | | | | NUM_WORDS=2 | | | | | | | | | BUS_NUM (LSB) | | | | | | | | CAB | | P_BUS_MSGS | | | | | |
| BUS_DATA | | | | | | | | | | | | | | | | | | | | | | | | | | | |

FIG.14

| 31 | | 28 | 27 | | | | | | | | | 16 | 15 | | | | | | | 8 | 7 | 6 | 5 | | | | | 0 |
|---|---|---|---|---|---|---|---|---|---|---|---|---|---|---|---|---|---|---|---|---|---|---|---|---|---|---|---|---|
| R | | | | NUM_WORDS=2 | | | | | | | | | STARTUP | | | | | | | | CAP | | P_POWER | | | | | |
| POWER | | | | | | | | | | | | | | | | | | | | | | | | | | | |

FIG.15

| 31 | | | | | | | | | | | | | | | | | | | | | | | | | | | | 0 |
|---|---|---|---|---|---|---|---|---|---|---|---|---|---|---|---|---|---|---|---|---|---|---|---|---|---|---|---|---|
| NUM_BYTES=8 | | | | | | | | | | | | | | | | | | | | | | | | | | | | |
| 3 | | | | | | | 2 | | | | | | | 1 | | | | | | | 0 | | | | | | | |

FIG.16

SYSTEM AND METHOD FOR OPERATING SOFTWARE IN A FLIGHT SIMULATOR ENVIRONMENT

CROSS REFERENCE TO RELATED APPLICATION

This application claims priority from U.S. Provisional Application Ser. No. 60/269,690, filed Feb. 17, 2001.

FIELD OF THE INVENTION

The present invention relates, generally, to systems and methods for employing secondary control system software in a flight simulator environment and, more particularly, to the use of an interface protocol which facilitates the use of flight management system software from an actual aircraft environment into a flight simulator environment.

BACKGROUND OF THE INVENTION

Hardware and software systems utilized on aircraft are becoming increasingly complex. Various sensors, displays, and the hardware and software utilized to monitor and control these systems are generally referred to as the aircraft's avionics systems.

For example, sensors may be used to monitor various parameters such as altitude, wind speed, direction, air pressure, temperature, and the like, and provide feedback to the crew of the aircraft regarding those parameters. The hardware systems used to sense these various parameters often include transducers configured to convert measured parameters into electrical signals, which are then applied to a number of hardware buses that provide electrical inputs to one or more flight computers. In addition, an aircraft's flight computers may also be configured to apply output signals to hardware buses, which interface with various sensors, displays, and the like to provide information to flight personnel, as well as to other flight computers and communications systems.

Many aspects of present day avionics systems have evolved from avionics systems of previous generations. As a result, many of the data buses for these avionics systems are complex. Moreover, many of the protocols, communications systems, and computing methodologies employed in modern day avionics systems have been specifically developed for the aircraft avionics industry, such as systems based on the ARINC 429 specification, and, hence, may not utilize many of the more recently developed protocols and computing methodologies that have been developed outside of the avionics industry.

The sophistication and complexity of an aircraft's avionics system may require that pilots, navigators, and other flight crew members receive in-depth training and/or periodic refresher training on the use and operation of these avionics systems. For this purpose, various flight simulator systems have been developed that allow flight crew members to be trained in a simulated cockpit environment.

Flight simulator systems may range from software applications loaded on a PC, on the one hand, to full cockpit mock-ups with simulated audio, visual, mechanical, and tactical feedback, on the other hand. Although it may be desirable to simulate the actual cockpit environment for many flight training applications, the cost of replicating avionics systems in a simulation environment can be quite high.

Figure 1:
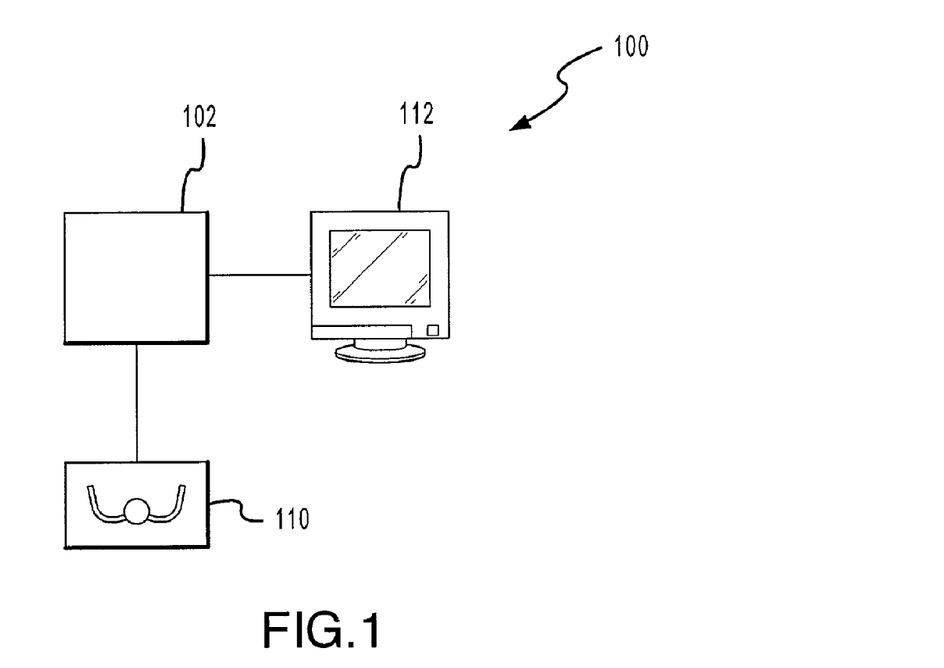
FIG. 1 is a block diagram illustrating a prior art flight simulator system.

With reference to FIG. 1, an exemplary flight simulator system is presented. Flight simulator system 100 contains a computer 102 that is configured to operate at least a portion of the flight simulator. Regardless of the complexity of the simulator, the purpose of the simulator is the same: to provide an environment in which a pilot can practice both the mechanics of flying an aircraft and experience the monitoring of the various systems of the aircraft without incurring the costs and dangers associated with flying an actual aircraft. Simulator 100 also includes controller 110 and display 112. It should be understood that controller 110 may be of various different configurations. For example, a single joystick can be used. In the alternative, a yoke may be used to simulate the controls of the aircraft. In addition, controller 110 may also include a separate throttle control, various pedals for rudder and brake control, and various buttons and controls to simulate various other functions.

Display 112 may be a single CRT or LCD that displays a simulated gauge panel from a cockpit, in addition to simulated cockpit windows that show the simulated surrounding scenery. In a larger simulation system, display 112 may comprise a plurality of displays. For example, one display may show the gauges, and various displays may simulate one or more windows of the cockpit.

A pilot using simulator 100 can view what the aircraft is simulated to be doing and react to the aircraft's performance by making various inputs to controller 110, such as pulling back on the control to climb or turning the control to the left to turn the aircraft simulation. Computer 102 receives the pilot's inputs and reacts accordingly. For example, if the pilot pulled back on controller 110 to climb, computer 102 changes display 112 such that a climb is indicated by changing the gauges simulated by computer 102 and changing the scenery displayed in a simulated window of cockpit. In a simulator with a hydraulically-controlled simulated cockpit, the hydraulics also move the simulated cockpit such that a climb is simulated.

For a more realistic and useful simulation, it may be desirable to simulate components of an aircraft in addition to those that directly affect the flight path of the aircraft. For example, the Flight Management System ("FMS") of an aircraft can be an important component which enables a pilot to access data concerning navigation, aircraft status, flight plan information, and the like. The Flight Management System is often used by pilots for flight planning, navigation, performance management, aircraft guidance, datalink communications, and flight progress monitoring to ensure optimum efficiency and effectiveness with a minimum workload. The capabilities of the FMS may include such functions as navigation, performance prediction and optimization, flight planning, managed guidance computations, back-up navigation, information display management, enhanced required time of arrival (RTA), required navigation performance (RNP), simplified loading of operational programs, operation program configuration (OPC) and airline modifiable information (AMI) databases, independent database crossloading, and future air navigation system (FANS) A capabilities. The FMS is typically designed to operate in a dual-mode wherein two FMS line-replaceable units (LRUs) are coupled together to provide redundant calculations for comparison. During degraded system modes, the FMS may singly operate if one FMS has failed or the FMS may operate independently of the other FMS. Because of the complexity and importance of the FMS, it is desirable for pilots training on a simulator to also simulate the operation of the FMS, in order to gain a more complete familiarity with the FMS.

Various flight simulation systems have been developed using computing and software technologies which may or may not also be employed in an actual aircraft.

For example, flight simulation applications may utilize platforms such as UNIX, Windows™, Windows NT™, Windows 2000™, or Windows XP™. In addition, many flight simulator systems employ Transmission Control Protocol/Internet Protocol ("TCP/IP") and other communication protocols which grew out of the PC and networking industries, but which may not be employed on actual aircraft systems. As a result, many secondary flight control software applications, such as an FMS application, must be adapted and modified from the versions used in the actual aircraft to be used in a simulator because they may communicate using standard aircraft communication protocols.

Some of the same companies which provide software and hardware systems to aircraft manufacturers also supply versions of these same hardware and software systems to manufacturers of flight simulators. However, since flight simulation environments often employ protocols and computing methodologies which are different from those used on an actual aircraft, flight simulator systems of the prior art often relied upon two different versions of these software products being developed: (1) a version for use on an actual aircraft that is compatible with the protocols and communication buses employed on an aircraft; and (2) a simulated version adapted for use in a simulation environment, and that is configured for use with the protocols, computing methodologies, and input/output systems associated with the simulation environment.

The version of the software used in the actual aircraft may be periodically updated to result in a more efficient or more feature-laden product. When the version of the software used in the actual aircraft is updated, the simulated version of the software must be updated if the version used in the simulation is to correspond with the version used on the actual aircraft. This requires that the simulation version of, for example, an FMS software application be updated periodically to reflect updates which are made in the actual aircraft version of the FMS application. The production of a simulation version thus leads to an increase in the cost and time of development, because of the need to create two separate versions of the same program. These costs may be exacerbated if the simulated version communicates in a different format than the version used on the actual aircraft.

Systems and methods are needed which reduce the time, cost, and complexity associated with creating, installing, and maintaining flight control hardware and software systems in a simulation environment.

SUMMARY OF THE INVENTION

The present invention provides, inter alia, a Flight Management System ("FMS") application for use in a flight simulation environment. In accordance with a preferred embodiment of the invention, the actual FMS application (or other secondary control system) that is used in an aircraft environment is included in the FMS application used in the simulator. In order to facilitate the use of the actual FMS code in a simulation environment, the invention further includes a software interface module which allows the FMS code to operate as if it is operating in an aircraft environment. Such a module may involve using a TCP/IP connection to transfer information from the simulator to the computer operating the FMS simulation.

In accordance with one aspect of the present invention, the actual object code of an FMS application may be used in a simulation environment. In order to facilitate this migration, an embodiment of the present invention includes an interface protocol which permits the FMS application to communicate with the external simulation. More particularly, a handshaking protocol can be used such that output data from the FMS application, which would be destined for a hardware transport on an actual aircraft, can be transferred via software in the simulation environment, with the additional opportunity to re-transmit data if the transmission fails. This interface protocol provides a low cost alternative to prior art simulation environments, which often replicate one or more of the hardware buses utilized on an aircraft. In this manner, the fact that an FMS application (or other secondary flight control application) is operating in a simulation environment is "transparent" to the FMS application; hence, the actual code that is employed on an aircraft may be used in the simulation environment. As a result, when the code which is used on an aircraft is modified, the version of the operating code used on aircraft may be ported directly into the simulation environment, thereby reducing the time, complexity, and cost associated with maintaining a current version of the FMS application in the simulation environment.

In accordance with a further aspect of the present invention, the databases utilized by the FMS application on an aircraft may also be installed in the simulation environment. In this way, the aircraft environment may be more accurately replicated in the simulation environment.

In accordance with a further aspect of the present invention, the same simulation version of an FMS application (or other flight control application) may be utilized in a variety of different simulation environments.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by any number of hardware or structural components configured to perform the specified functions. In addition, the present invention is not limited to an FMS system, as the present invention may be generally used with any type of system simulated in a flight simulator or in any system using diverse computing platforms. Such general applications that may be appreciated by those skilled in the art in light of the present disclosure are not described in detail herein. However for purposes of illustration only, exemplary embodiments of the present invention will be described herein in connection with FMS systems used in conjunction with flight control systems and flight simulation systems. Further, it should be noted that, while various components may be suitably coupled or connected to other components within exemplary circuits, such connections and couplings can be realized by a direct connection between components, or by a connection through other components and devices located therebetween.

When used in an actual aircraft environment, an FMS computer receives various inputs, performs flight management computing functions known to those skilled in the art, and transmits various outputs. For example, in an actual aircraft environment the FMS computer may receive inputs in the form of electronic signals from a plurality of hardware buses. These input signals may relate to various parameters such as altitude, time of day, wind speed, attitude, ground speed, and the like. The FMS computer may also be configured to apply output signals to one or more hardware buses. The output signals may be transmitted to screen displays, databases, flight computers, communication systems, and the like. The FMS computer may receive input signals directly from hardware systems such as sensors, transducers, and the like; the FMS computer may also be configured to retrieve input signals from a database configured to accumulate input data.

Figure 2:
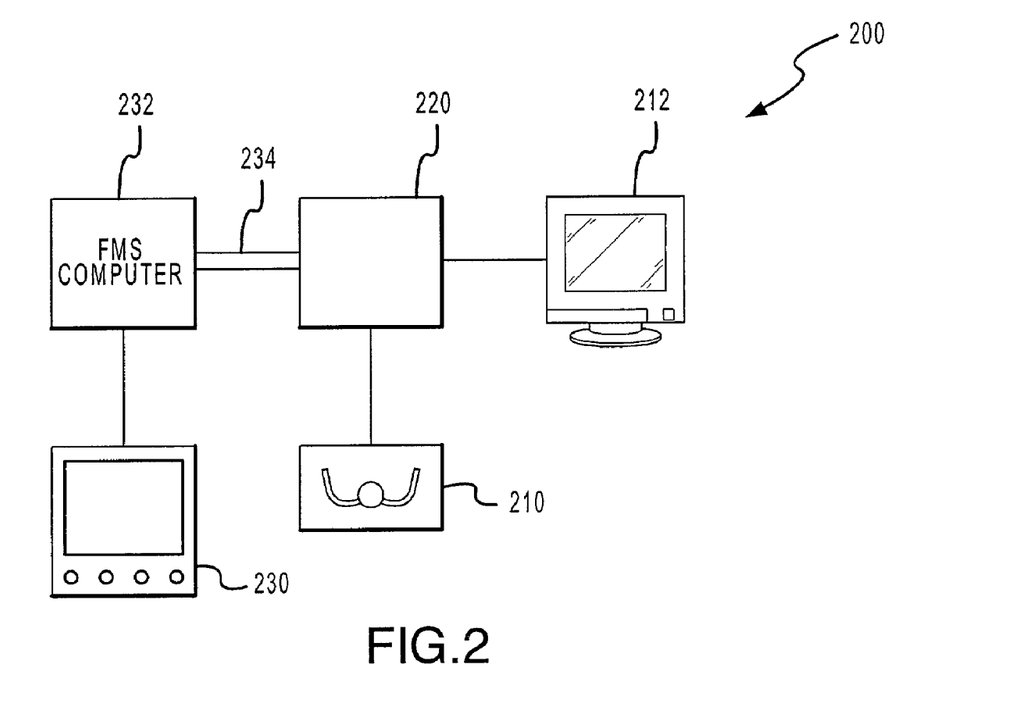
FIG. 2 is a block diagram showing a flight simulator system incorporating an FMS system of the present invention.

With reference to FIG. 2, a system containing an exemplary embodiment of the invention will now be presented. Simulator 200 contains some of the same components as simulator 100, including a controller 210 and a display 212. As discussed above, controller 212 may be a joystick, yoke, throttle control, foot pedals, or other suitable device or combination of devices used for accepting pilot input. Both a display 210 and a controller 212 are coupled to a simulator computer 220 that controls display 210 based on the inputs to controller 212. It should be understood that, in a more complex simulator system, simulator computer 220 may also be coupled to various hydraulics to simulate the movement of an aircraft as well as loudspeakers to provide audio feedback. It should be further understood that display 210 may comprise more than one display unit, in order to provide a more realistic cockpit simulation.

Also illustrated in FIG. 2 is an FMS input simulator 230. An FMS system generally requires an apparatus for accepting inputs from one operating the FMS system. This apparatus may take the form of a console. FMS input simulator 230 performs the functions of a traditional console for an FMS system and affects simulator 200 in the same manner that an FMS system affects an aircraft in which it is installed. For example, in an aircraft, an FMS system may be used to provide navigational information to an auto-pilot system. Such a feature may also be present in simulator 200. In order to affect simulator 200, FMS input simulator 230 is coupled to FMS computer 232, which is coupled to computer 220 via a TCP/IP socket 234.

A typical aircraft has a variety of systems interconnected using various industry standard buses, such as the ARINC 429 bus and the ARINC 629 bus, as well as through the use of discrete data transmitted along proprietary buses. Because of the large amount of data being transmitted on the various buses, the timing of the information transmitted on the bus can be important to the operation of the aircraft.

Because an embodiment of the present invention runs the FMS software that is actually used on an aircraft, the interface between FMS computer 232 and simulator computer 220 may be configured to translate the data from the various internal formats used in the actual aircraft to a TCP/IP format that is usable by the simulator. This translation may occur in either FMS computer 232 or simulator computer 220, or may even occur in both FMS computer 232 and simulator computer 220. Thus, an embodiment of the present invention ideally multiplexes ARINC 429, ARINC 629 buses, and discrete data; includes SafeBus messages; is backwards compatible; maintains frame consistency; has multiple task connectivity and routing; supports both real-time and simulated time modes; contains a duplication of route data for increased throughput; and has the capability for debugging and monitoring.

Figure 5:
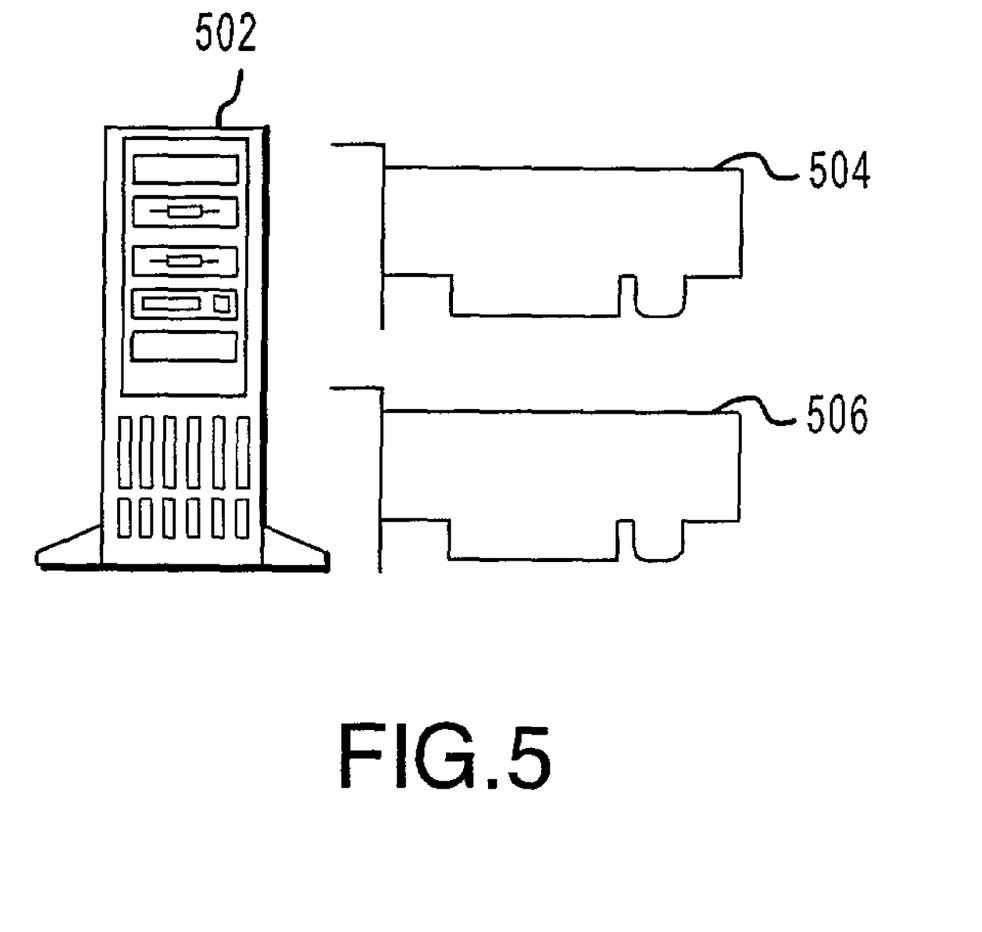
FIG. 5 illustrates the layout of an FMS computer.

With reference to FIG. 5, an embodiment of FMS computer 232 comprises a workstation 502 running a version of Microsoft's Windows NT operating system software. The workstation also includes one or more Peripheral Component Interconnect ("PCI") cards 504 and 506. (While PCI cards 504 and 506 are illustrated as being external to workstation 502, it should be understood that, in actual operation, PCI cards 504 and 506 are inserted into PCI slots that are located within workstation 502.) PCI cards 504 and 506 serve to operate the FMS software on the workstation: as the FMS software on an aircraft does not run on a Windows NT workstation, PCI cards 504 and 506 simulate the hardware that is used to run the FMS software on an aircraft. Each PCI card represents a single FMS LRU. Thus, inputs to input simulator 230 are processed by FMS computer 232 in the same manner as the inputs would be processed in an aircraft.

Figure 3:
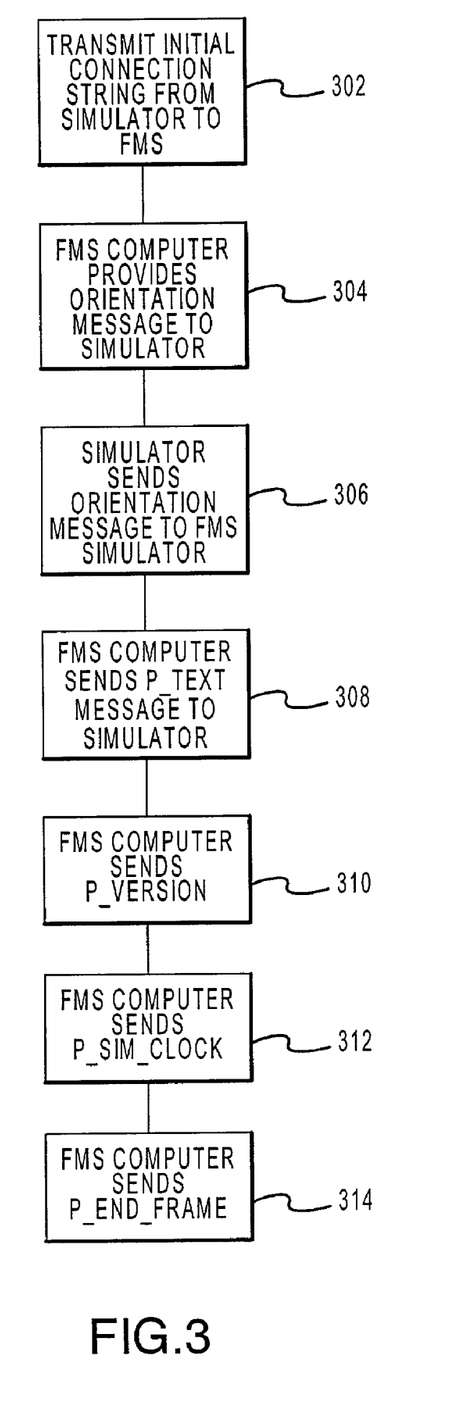
FIG. 3 shows a flow chart of the operation of a flight simulator system of the present invention.

With reference to FIG. 3, the operation of an embodiment of the invention upon initial startup will now be discussed. Upon the startup of the system, simulator computer 220 transmits an initial connection string to FMS computer 232 (step 302). FMS computer responds by providing an orientation message to simulator computer 220 (step 304). Simulator computer 220 responds by providing another orientation message to FMS computer 232 (step 306). FMS computer 232 then sends a variety of messages to simulator computer 220, including one or more P_TEXT messages (step 308); a P_VERSION message (step 310); a P_SIM_CLOCK message (step 312); and a P_END_FRAME message (step 314). The function of these various messages will be discussed in further detail supra.

Figure 4:
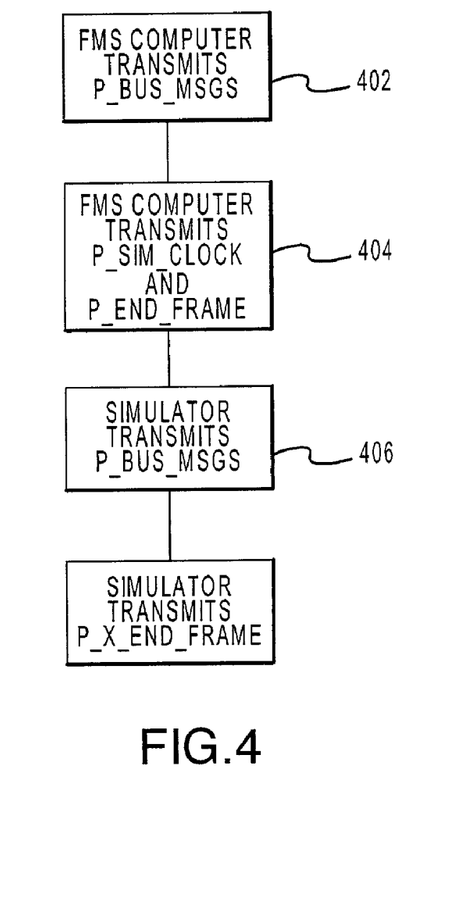
FIG. 4 illustrates a flow chart showing the operation of a flight simulator system of the present invention

The normal operation of an embodiment of the invention will now be discussed, with reference to FIG. 4. During normal operation, FMS computer 232 transmits a P_BUS_MSGS message to simulator computer 220 (step 402) along with P_SIM_CLOCK and P_END_FRAME messages (step 404). In response, simulator computer 220 sends P_BUS_MSGS to FMS computer 232 (step 406), followed by P_X_END_FRAME (step 408).

The transmission of information over the TCP/IP connection will now be discussed. ARINC 429 is a specification defining how avionics equipment and systems communicate with each other. Systems employing the ARINC 429 standard typically use twisted-pairs of wires to unidirectionally transmit 32-bit words at a bit rate of either 12.5 kilobits per second (low-speed) or 100 kilobits per second (high-speed).

Data that is transmitted on an ARINC 429 bus in an aircraft is typically formatted per the ARINC 429 specification and packed into a 32-bit word before being transmitted. In an embodiment of the present invention, the 32-bit word is transmitted via the TCP/IP connection and transmitted to simulator computer 220.

Figure 6:
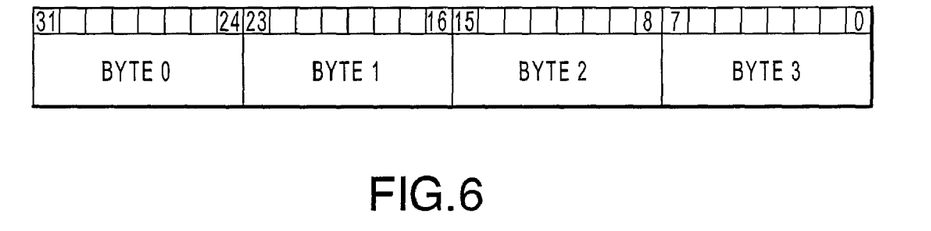
FIG. 6 illustrates the format of a 32-bit word in a big endian format.

For purposes of illustration, it will be assumed that the data being processed in this invention is running on a "big endian processor". In a big endian processor, with reference to FIG. 6, the most significant byte ("MSB") of a 32-bit word is on the left and the least significant byte ("LSB") is on the right. The MSB is byte 0 (lower byte address) and the LSB is byte 3. Bits are numbered 0–31 with bit 31 being the most significant bit on the left side of the diagrams, and bit 0 being the least significant bit on the right side of the diagrams.

Figure 7:
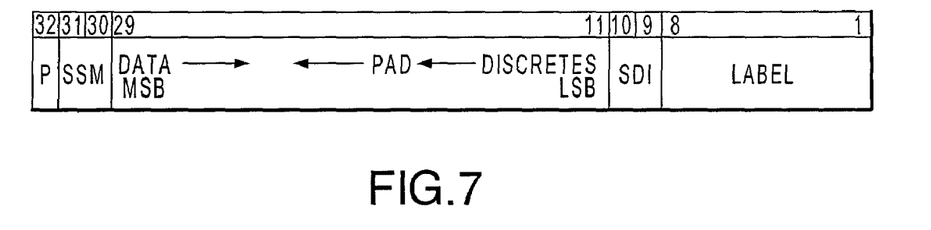
FIG. 7 illustrates the format of an ARINC 429 word.

FIG. 7 presents the format of an ARINC 429 word. According to convention, the ARINC 429 bits are numbered from 1 to 32 instead of from 0 to 31. Bit 32 is the parity bit, where odd-parity is typically used. Bits 31–30 contain the sign/status matrix ("SSM"), which indicates hardware equipment condition, operational mode, or the validity of data content. Bits 29–11 contain the data, which may be in a variety of different formats, detailed later. Bits 10–9 provide a source/destination identifier ("SDI") that identifies the receiver for which the data is destined. Bits 8–1 contain a label identifying the data type and the parameters associated with the data type.

Because FMS computer 232 may be configured to send and receive data in an ARINC 429 format while simulator computer 220 communicates in a different format, data is typically translated between the formats. Although TCP/IP format is illustrated in the following examples, embodiments of the present invention can be adapted to various other formats that currently exist or may exist in the future. Such a translation may involve parsing the information in the ARINC 429 format and placing the information in a TCP/IP packet. A translation from TCP/IP to ARINC 429 is similar, in that information in a TCP/IP packet may be parsed and placed in the ARINC 429 format shown in FIG. 7. Various other methods of translation may also be used.

FMS computer 232 communicates with the simulator computer 220 (hereinafter "external simulator computer" or "XSIM") via TCP/IP socket 234. In a preferred embodiment, XSIM monitors the TCP/IP port for an incoming socket connection (hereinafter "FMS socket"). Once XSIM and FMS computer 232 are coupled to each other, an initial connection string is transmitted by XSIM. In a preferred embodiment, the initial connection string contains a string identifying the simulator, such as "FMS". In addition, the initial connection string may contain space-separated options that XSIM transmits to FMS computer 232. These options may include an aircraft identifier, a selection of a dual-FMS mode or single FMS mode, and a selection of real-time or simulated time mode. An exemplary initial connection string may be as follows:

"FMS2 -aircraft a340 -pseudo_real -dual"

or

"FMS2 -aircraft a320 -priority 3"

Once the initial connection string has been transmitted, further TCP/IP communication between XSIM and the FMS computer may be accomplished through the use of message buffers. Although larger buffer sizes may be used, a preferred embodiment uses message buffers sized from 8 to 4096 bytes. It should also be understood that multiple message buffers may be transmitted during a simulation frame. The first four bytes of the message buffer indicates the number of bytes (NUM_BYTES) in the entire message buffer. The following four bytes of the message buffer may contain the following:

1) an orientation pattern (exchanged during the initial startup of the protocol);

2) a buffer header word that contains the number of words and the number of messages in the buffer; or 3) a disconnect pattern (4 bytes containing all zero bits).

An orientation pattern is an 8-byte message buffer transmitted by FMS computer 232. XSIM transmits the same message back to the FMS computer.

A disconnect message is a word sent from XSIM to the FMS computer containing a first 32-bit word indicating that 8 bytes is being transmitted (NUM_BYTES=8) and a second 32-bit word containing all zeros.

Following the transmission of the buffer header word, the messages will then be transferred. Because the number of words and messages are transmitted first, both the receiving computer and sending computer are aware of the quantity of information expected to be transmitted/received. The messages are then transferred between the computing systems and the computing systems can process the information in the traditional manner.

A simulation frame represents all the data transmitted/received within the base rate of time for the FMS computer. A "snapshot" of the data on the busses is typically taken at the beginning of the simulation frame and all the data processed by the FMS computer during the simulation frame are based on that snapshot. Thus, the FMS has consistent data to perform calculations on, as sensor data and pilot input data is taken from a single moment in time. The base rate of time is dependent on the particular system being simulated. For example, if the base rate of time is X milliseconds, then the reception of a complete simulation frame represents the passing of X milliseconds according to the simulator. In the protocol, the end of a frame of data from the FMS computer is marked by a P_SIM_CLOCK message (containing the simulated real-time clock) followed by an empty P_END_FRAME message. The FMS computer expects a P_X_END_FRAME message as a marker of the end of the XSIM frame.

It should be noted that, depending on the size of the message buffer, the data transmitted on completion of a simulation frame may require more than one message buffer. It should be further noted that the frame rate for XSIM and the FMS computer need not be the same: the rate of the FMS computer might be, for example, 25 milliseconds for the simulation of one particular type of aircraft, but may be 30 milliseconds for another simulation. Other data may be required at twice the above-listed rates and may be spread over several 25 or 30 millisecond frames for performance reasons.

Multiple messages may be grouped into a message buffer being transmitted by either XSIM or the FMS computer. This increases the performance of the TCP/IP connection. At the end of a simulation frame, both simulators send I/O data produced from the frame in as few buffers as possible. The last message in the last buffer of a simulation frame is typically an end-of-frame marker message, as described above.

It should be noted that, during the initial startup of the system, various version number and text output messages may be transmitted by the FMS computer and the FMS computer may transmit buffers that are not full of messages. In addition, the FMS computer, upon the detection of error conditions, will transmit text messages (P_TEXT) that will cause an immediate flush of buffers.

Message buffers are typically at least 8 bytes long, with the first four bytes indicating the number of bytes in the message buffer (NUM_BYTES). The transmitter of the message buffer makes a single call to the TCP/IP function "send" to send the message buffer to the receiver. The receiver of the message buffer makes two "recv" calls, one call to read the size of the buffer and one call to read the remainder of the buffer.

In a preferred embodiment of the invention, the second word of a message buffer may contain one of three possible words:

1) An orientation pattern (only during initial exchange as defined in the protocol startup);

2) A disconnect pattern (four bytes of zero), which requests a cease of communication and closes the TCP/IP socket; or 3) NUM_WORDS, which indicates the (non-zero) number of words in the message buffer (to a maximum of 1023), followed by NUM_MSGS, which indicates the (non-zero) number of variable length messages in the message buffer.

Figure 8:
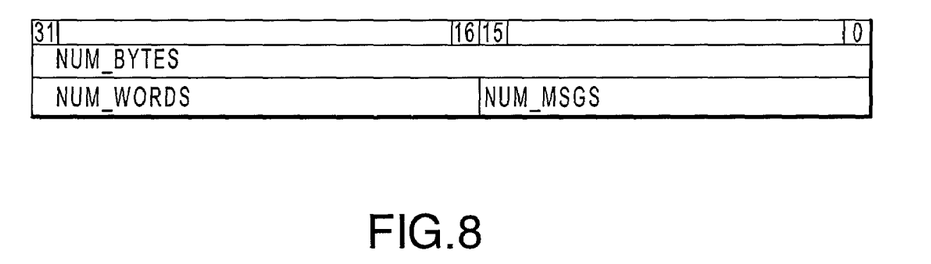
FIG. 8 illustrates the first two words of an exemplary message buffer.

An exemplary illustration of the contents of the first two 32-bit words of an exemplary message buffer is shown in FIG. 8.

Figure 9:
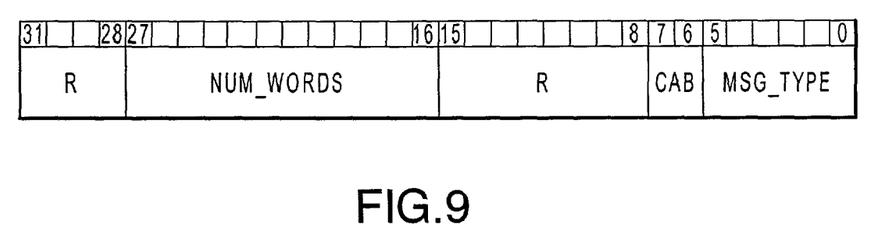
FIG. 9 illustrates the format for a header word of a variable-sized message.

FIG. 9 illustrates the format for a header word for a variable-sized message. The fields labeled "R" are reserved and are typically transmitted as all zeroes by XSIM. NUM_WORDS is the number of 32-bit words in the message (including the header word). CAB is the cabinet ID on BUS oriented messages. The MSG_TYPE field defines the type of message being transmitted.

The formats of various types of messages will now be discussed. It should be understood that FMS PCI cards 504 and 506 (see FIG. 5) communicate in their own internal format (e.g., ARINC 429 format). In order to communicate with XSIM, FMS workstation 502 may be configured to translate the TCP/IP packets into the ARINC 429 format, such that the FMS cards are able to transmit and receive data in the correct format.

Figure 10:
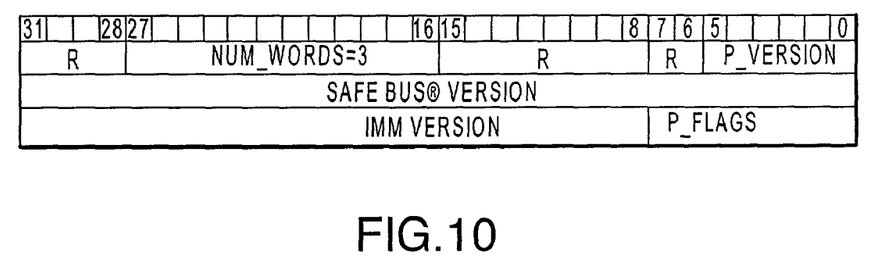
FIG. 10 illustrates the format of a P_VERSION message.

With reference to FIG. 10, the format of a P_VERSION message is presented. P_VERSION is transmitted from the FMS computer to XSIM one time after initial connection and contains version information pertaining to the simulation software within the FMS computer.

Figure 11:
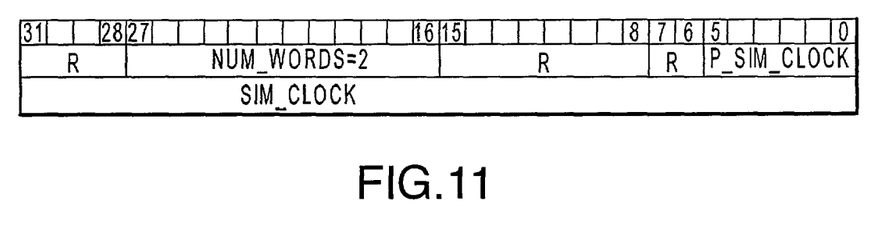
FIG. 11 shows an exemplary P_SIM_CLOCK message.

FIG. 11 presents an exemplary P_SIM_CLOCK message from the FMS computer to XSIM. This message contains the simulated real-time clock ("RTC") from the I/O simulation of the FMS computer. This message is ignored in the real-time mode of FMS computer 232. For simulations that are not executed in real-time, this clock is used to synchronize XSIM to the execution speed of FMS computer 232. The real-time or simulated-time modes of operation does not affect the messages and/or the format of the data exchanged in the protocol. In the simulated-time mode, FMS computer 232 provides the source of the simulated clock (milliseconds since the start of simulation) that must be used by XSIM. When running in real-time mode, this clock may be ignored and the simulation frames may be counted to establish timing.

Figure 12:
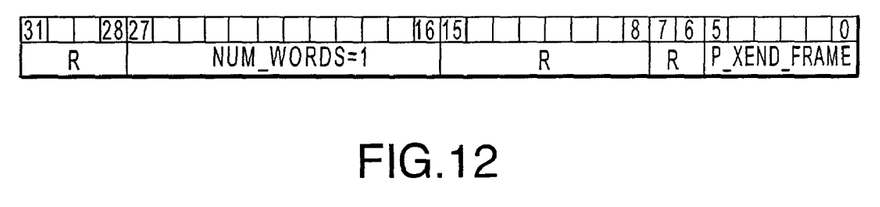
FIG. 12 presents an exemplary P_X_END_FRAME message.

FIG. 12 presents an exemplary message containing a P_X_END_FRAME message. This format may also be used for the P_END_FRAME message. The P_X_END_FRAME message is transmitted from XSIM to the FMS computer to mark the end of a frame of data from XSIM. The P_END_FRAME message is transmitted from the FMS computer to XSIM to indicate the end of a frame of data. It is the last message in a buffer and all data following the P_END_FRAME message is ignored.

Figure 13:
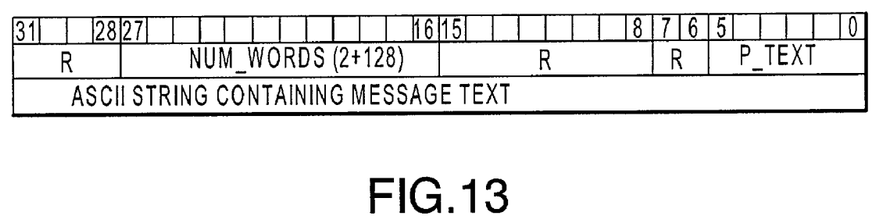
FIG. 13 depicts the format of a P_TEXT message.

FIG. 13 presents an exemplary format of P_TEXT messages. These messages are transmitted from the FMS computer to XSIM. XSIM may ignore the messages or they may be logged/displayed for debugging purposes. These messages may be used to transmit an error condition. As the word count is limited to 128 in certain embodiments, the ASCII string is less than 512 bytes in length (each word contains 4 bytes).

Figure 14:
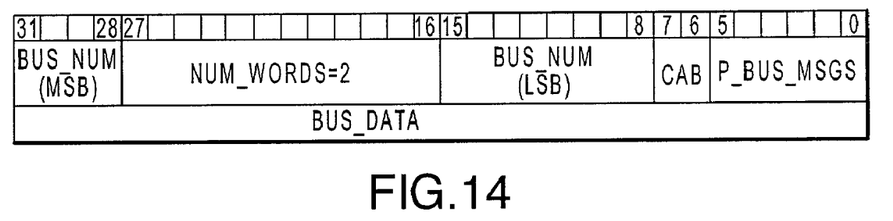
FIG. 14 illustrates the format of P_BUS_429, P_BUS_DIS, and P_BUS_ANA messages.

FIG. 14 presents an exemplary format for P_BUS_429, P_BUS_DIS, and P_BUS_ANA messages. The field marked P_BUS_MSGS indicates which bus is being used: either P_BUS_429, P_BUS_DIS, or P_BUS_ANA, for ARINC 429, discrete, or analog buses, respectively. In one embodiment, a value of 26 indicates an ARINC 429 bus, a value of 27 indicates a discrete bus, and a value of 28 indicates an analog bus. The field labeled CAB indicates to which cabinet a message should be sent. The FMS computer may be running in a dual-mode, where two FMS computers are running. CAB indicates to which cabinet the message is sent. The value of BUS_NUM indicates which bus number is being used. BUS_DATA contains the data in the correct format.

Figure 15:
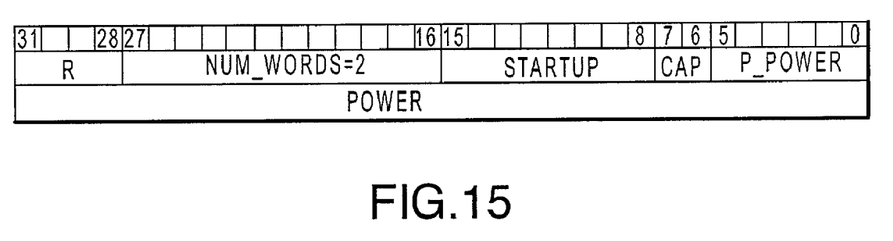
FIG. 15 shows the format for an exemplary P_POWER message.

FIG. 15 presents an exemplary format for the P_POWER message. This message turns the power to the FMS computer on or off. These messages send data on simulated buses. After an initial connection, power is considered on. XSIM may shut off one or both of the FMS computers by sending this message. The CAB field indicates for which FMS computer (in a dual-FMS configuration) the message is intended. The POWER field is set to 1 to turn an FMS computer on and set to 2 to turn an FMS computer off. It should be noted that sending a POWER=1 message to an FMS computer that is already on preferably has no effect on the FMS computer. In addition, it should be noted that the P_POWER message may also be used to simulate power interruptions that occasionally occur on real aircraft.

Figure 16:
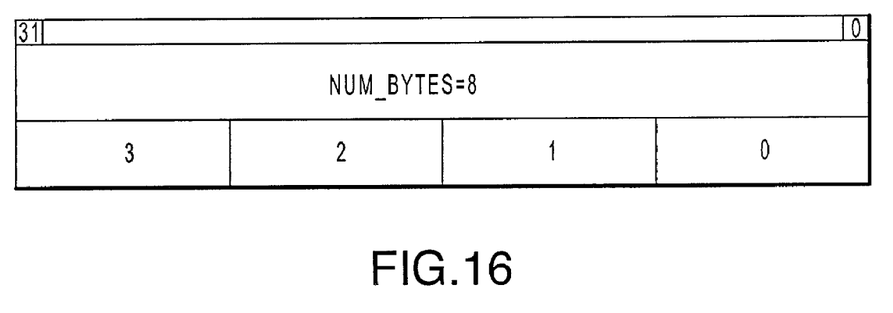
FIG. 16 presents the format of an exemplary Protocol Orientation Word.

FIG. 16 presents the format of an exemplary Protocol Orientation Word. The FMS computer sends this message to XSIM and XSIM responds by sending the same message to the FMS computer.

The above description presents exemplary modes contemplated in carrying out the invention. The techniques described above are, however, susceptible to modifications and alternate constructions from the embodiments shown above. Other variations and modifications of the present invention will be apparent to those of ordinary skill in the art, and it is the intent of the appended claims that such variations and modifications be covered. For example, while the invention has been described with reference to 32-bit words, the invention is also applicable to systems using 64-bit words. In addition, the buffer size can be enlarged from 4096 bytes to a larger size for performance enhancements, and the "Number of Words" word can be increased from a 16-bit word to a 32-bit word followed by the corresponding 32-bit word representing the "Number of Messages" word. Also, the platform operating system can change based upon the current technology. In addition, additional messages can be added to an embodiment of the present invention to enhance the capabilities.

Consequently, it is not the intention to limit the invention to the particular embodiments disclosed. On the contrary, the invention is intended to cover all modifications and alternate constructions falling within the scope of the invention, as expressed in the following claims when read in light of the description and drawings. No element described in this specification is necessary for the practice of the invention unless expressly described herein as "essential" or "required."

We claim:

1. A method of exchanging information between a first computer system to a second computer system in a flight simulator environment, the method comprising:

transmitting in a network communication format an initial connection string from said first computer system to said second computer system, the initial connection string identifying said first computer system;

transmitting in a network communication format a first orientation message from said second computer system to said first computer system;

sending in a network communication format a second orientation message from said first computer system to said second computer system; and sending in a network communication format various informational messages from said first computer to said second computer.

2. The method of claim 1 wherein said second computer is a flight simulator system.

3. The method of claim 1 wherein said first computer is a Flight Management System computer.

4. The method of claim 1 wherein said first computer communicates in an ARINC 429 format;

said second computer communicates in a TCP/IP format; and said method further comprises:

translating information from ARINC 429 format to TCP/IP format prior to sending information from said first computer to said second computer; and translating information from TCP/IP format to ARINC 429 format subsequent to sending information from said second computer to said first computer.

5. The method of claim 1 wherein, said informational messages comprises data indicating an end of frame.

6. The method of claim 1 wherein said informational messages comprises data indicating a version number.

7. The method of claim 1 wherein said informational message comprises an indication of the length of the messages.

8. The method of claim 1 wherein said information messages comprise data formatted in frames.

9. The method of claim 8 wherein said frames contain a representation of data at a specific moment in time.

10. The method of claim 9 wherein said frames are periodic.

11. The method of claim 10 wherein the period of said frames ranges from approximately 25 to 30 milliseconds.

12. A flight simulator system comprising:

a first computer;

a second computer coupled to said first computer, wherein said first computer is configured to communicate in a first data format and further configured to transmit an initial connection string identifying said first computer to said second computer, said second computer is configured to communicate in a second data format and is configured to transmit a first orientation message to said first computer upon receiving said initial connection string, said first computer further configured to transmit a second orientation message to said second computer upon receiving said first orientation message; and data is transmitted between said first computer and said second computer in a network communication format.

13. The flight simulator system of claim 12 wherein said first computer is configured to translate data between said first data format and said second data format.

14. The flight simulator system of claim 13 wherein said second computer is configured to translate data between said first data format and said second data format.

15. The flight simulator system of claim 12 wherein said second computer is configured to process flight management system commands.

16. The flight simulator system of claim 15 wherein said second computer is configured to operate software identical to software used in aircraft systems.

17. The flight simulator system of claim 15 further comprising:

an input simulator coupled to said second computer, wherein said input simulator is configured to accept inputs from a user and transmit said inputs to said second computer.

* * * * *